Patented June 15, 1954

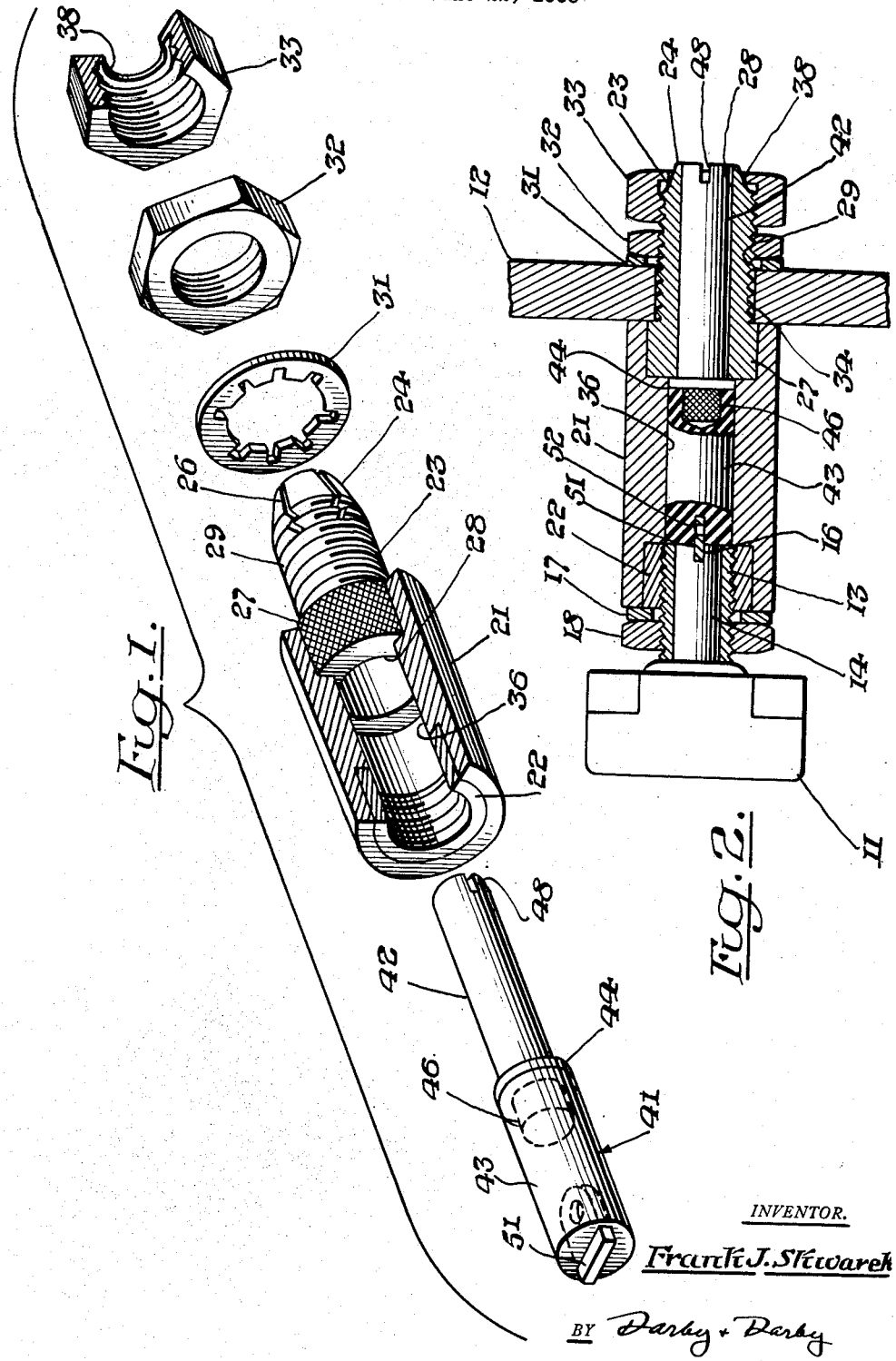
June 15, 1954     F. SKWAREK     2,681,378
INSULATED COUPLING ASSEMBLY
Filed June 22, 1953
INVENTOR.
Frank J. Skwarek
BY Darby & Darby
ATTORNEYS.

2,681,378

UNITED STATES PATENT OFFICE 2,681,378

INSULATED COUPLING ASSEMBLY

Frank Skwarek, Westbury, N. Y., assignor to Polarad Electronics Corporation, Brooklyn, N. Y., a corporation of New York Application June 22, 1953, Serial No. 363,218

4 Claims. (Cl. 174—138)

The present invention relates to insulated coupling assemblies, particularly for insulated mounting of adjustable electrical elements on panels or chassis.

In many electrical and electronic equipments it is necessary to mount an adjustable electrical element such as a potentiometer, rheostat, or variable capacitor, from a panel or chassis. In general, such panels or chassis are formed of metallic material, and their use with high-voltage equipment creates a problem with respect to safety from shock hazard and with respect to high voltage breakdown.

According to the present invention, there is provided a simple, rugged vibration and shock resisting coupling assembly suitable for mounting circuit elements from panels or chassis or the like, while maintaining circuit isolation and eliminating danger of electrical shock to operating personnel. The coupling assembly according to the present invention provides excellent high-voltage breakdown characteristics, is rugged, of long life, and safe in operation, and is easily assembled with the circuit element to be coupled to form an adjustable shaft assembly which is vibration and shock proof, meeting the requirements of military procurement specifications.

Other objects and advantages of the present invention will become apparent from consideration of the following description of a preferred embodiment thereof taken in conjunction with the appended drawing, in which Figure 1 shows a perspective view partly in cross-section of the insulated coupling assembly of the present invention; and Figure 2 shows a longitudinal cross-sectional view of the present invention assembled with an electrical circuit element and a panel as in actual use.

Referring to the drawing, the present invention is designed for mounting and coupling a desired variable electrical circuit element, illustratively shown as a potentiometer 11, upon a panel or chassis wall fragmentarily shown at 12. As is conventional, the variable circuit element 11 is provided with an externally threaded sleeve 13 affixed thereto, within which is rotatably mounted an actuating shaft 14 for the circuit element 11. Conventionally, such actuating shaft 14 terminates in a screw driver slot 16 extending transversely thereacross, for the purpose of permitting adjustment thereof by use of a screw driver or similar tool.

The insulated coupling assembly of the present invention provides the structure required for rigidly securing the variable circuit element 11 to the panel 12 and for permitting simple and easy operation of the actuating shaft 14 thereof, while providing proper electrical insulation. The coupling assembly comprises an insulating sleeve 21 preferably molded from a suitable rugged insulating material having excellent high-voltage breakdown characteristics, such as melamine. Molded within the sleeve 21 at one end is an internally threaded insert 22 which may, for example, be formed of any metallic material, preferably corrosion resistant, such as stainless steel or nickel-plated brass. Similarly molded in the other end of the insulating sleeve 21 is a bushing 24 having an externally threaded portion 29 extending beyond sleeve 21 and with a tapered end 26 having longitudinal slits 26. The insert 22 and bushing 23 are preferably knurled at their outer surfaces, such as at 27, in contact with the material of the sleeve 21 to make rigid assembly with the sleeve 21. As shown most clearly in Figure 2, the insert 22 has an internally threaded bore therein in alignment with the bore of sleeve 21. The bushing 23 has a smooth coaxial bore 28 of smaller diameter. Cooperating with the external threads 29 of the bushing 23 are a conventional lock washer 31, lock nut 32 and clamp nut 33. As shown in Figure 2, the threaded portion 29 of bushing 23 is passed through an aperture 34 in the wall 12 and the lock washer 31 and lock nut 32 serve to clamp the panel 12 between them and the end of the sleeve 21, thereby rigidly mounting the assembly upon the wall 12.

Contained within the bore 36 of sleeve 21 and bore 28 of bushing 23 is a shaft 41 having a metallic section 42 of diameter rotatably fitting the bore 28 and an insulating section 43 of diameter rotatably fitting the bore 36. If desired, section 42 could also be of insulation. Shaft portion 42 is provided with an enlarged flange 44 of the same diameter as insulated shaft portion 43, and also has a reduced and outwardly knurled extension 46 which is preferably molded within the insulating shaft portion 43. Into the other end of the insulated shaft portion 43 there is molded a small flat insert 51 extending generally diametrally of the end of the insulating shaft portion 43 and projecting therefrom by a short distance such as of the order of $\frac{1}{16}$ to $\frac{1}{8}$ inch. The insert 51 is preferably formed with an aperture 52 so that, when molded into the insulated shaft portion 43, the molding material engaging the aperture 52 will grip and retain the insert 51. As will be seen, this insert 51 acts as a screw driver tip. At the opposite end of the shaft 41 a diametral slot 48 is formed in the metallic shaft portion 42.

As seen in Figure 2, upon insertion of the shaft 41 within the bores 36 and 28 the flange 44 serves to prevent rightward movement of the shaft 41. The threaded extension 13 of the variable circuit element 11 is threaded into the insert 22, and the tip 51 of the shaft 41 engages the slot 16 in the actuating shaft 14 of the variable circuit element 11. This variable circuit element 11 may then be secured to the insulating sleeve 21 by means of a lock washer 17 and lock nut 18, leaving shaft 41 free to turn.

In the above manner the electrical circuit element 11 is completely isolated from the panel 12 by means of both the insulated shaft portion 43 and insulated sleeve 21, so that there is no possibility of high voltage breakdown or shock hazard on the operating side of the panel 12, which in the figure is on the right. The variable circuit element 11 can be readily actuated or adjusted by means of the slot 48 in the shaft 41, which can be engaged by a screw driver or similar tool for adjustment. The clamp nut 33 may then be tightened on the end of the threaded insert 23. As is shown, this clamp nut 33 has an inwardly extending flange portion 38 which engages the slotted tapered portion 24 of the bushing 23 in a wedge-type action to compress this slotted tapered portion 24 inwardly to clamp upon the shaft metallic portion 42. It will be understood that by this means the adjustment of the variable circuit element is locked in place to prevent accidental or undesired change thereof.

Accordingly, by the present invention there has been provided a rugged, vibration and shock proof mounting and coupling assembly for variable circuit elements, preventing high voltage breakdown or shock hazard to the operator thereof.

It will be understood that the above embodiment of the invention is intended to be illustrative only, since many variations thereof can be readily devised by those skilled in the art, without departing from the spirit or scope of the present invention, which is defined solely by the appended claims.

What is claimed is:

1. An insulated coupling assembly for mounting an adjustable circuit element from a panel or the like, comprising an insulated sleeve having a bore, an internally threaded insert molded within said sleeve at one end thereof for joining to said circuit element and having a bore substantially the same as that of said sleeve, a bushing also molded into said sleeve at the other end thereof and having a bore less than said first bore, said bushing extending beyond said insulated sleeve and having an external threaded portion, the end of said external threaded portion being tapered and longitudinally slitted, an actuating shaft within said sleeve and bushing and having two portions of diameters respectively rotatably cooperating with said two bores, the portion of said shaft cooperating with said insulated sleeve being formed of insulating material, a screw driver tip at one end of said insulating shaft portion, a screw driver slot formed at the other end of said shaft, means for clamping said shaft with respect to said bushing, comprising an internally threaded clamp nut having a portion cooperating in wedge fashion with said slitted tapered bushing end, and means for mounting said sleeve in a panel or the like, comprising a lock nut cooperating with said threaded bushing, whereby a variable electrical circuit element having an actuating shaft with a screw driver slot therein mounted within an externally threaded sleeve may be assembled to said insulated sleeve by threading said sleeve in said insert with said latter screw driver slot cooperating with said screw driver tip so that said first-mentioned shaft may insulatedly adjust said element actuating shaft without shock or voltage breakdown hazard.

2. An insulated coupling assembly for mounting, from a panel or the like, an adjustable circuit element having an operating shaft comprising an insulated sleeve having a bore, an internally threaded insert molded within said sleeve at one end thereof for joining to said circuit element and having a bore substantially the same as that of said sleeve, an insulated bushing also molded into said sleeve at the other end thereof and having a bore less than said first bore, said bushing extending beyond said insulated sleeve and having an externally threaded portion, the end of said threaded portion being tapered and longitudinally slitted, an actuating shaft having two portions of diameters respectively cooperating with said two bores, the portion of said latter shaft cooperating with said insulated sleeve being formed of insulating material, means at one end of said insulating shaft portion for actuating said circuit element shaft, means formed at the other end of said actuating shaft for adjustment thereof, means for clamping said actuating shaft with respect to said bushing comprising an internally threaded clamp nut having a portion cooperating in wedge fashion with said slitted tapered bushing end, and means for mounting said sleeve in a panel or the like, comprising a lock nut cooperating with said threaded bushing whereby said circuit element may be secured to said insulated sleeve and insert to have its operating shaft actuated by said actuating shaft without shock or voltage breakdown hazard.

3. An insulated coupling assembly for mounting from a panel or the like, an adjustable circuit element having an operating shaft, comprising an insulated sleeve having a bore, means at one end of said sleeve for securing said circuit element thereto with said circuit element operating shaft aligned with said bore, a bushing secured to said sleeve at the other end thereof and having a bore less than said first bore, said bushing extending beyond said sleeve and having an externally threaded portion with a tapered and longitudinally slitted end, an actuating shaft within said sleeve and bushing and having two portions of diameters respectively rotatably cooperating with said bores, the portion of said actuating shaft cooperating with said insulated sleeve bore being formed of insulating material, means at one end of said actuating shaft for actuating said circuit element operating shaft, means for mounting said sleeve in a panel or the like comprising a lock nut cooperating with said threaded bushing for securing said panel between said sleeve and said nut, and means for clamping said actuating shaft with respect to said bushing.

4. An insulated coupling assembly for mounting from a panel or the like an adjustable circuit element having an operating shaft, comprising an elongated member having a bore therethrough with larger and smaller diameter portions, means for securing said circuit element to one end of said larger diameter bore portion of said member, the smaller diameter bore portion of said member having a smaller outer diameter than the remainder of said member and being externally threaded, an actuating shaft within said member and having two portions of diameters respectively rotatably cooperating with said two bore portions, means at one end of said actuating shaft for actuating said circuit element operating shaft, and means for mounting said member from a panel or the like comprising a lock nut cooperating with said externally threaded member portion and adapted to clamp said panel or the like between said nut and the larger portion of said member.

No references cited.